June 27, 1961 F. E. BEST 2,990,223
TAPERED ROLLER BEARING
Filed June 6, 1955
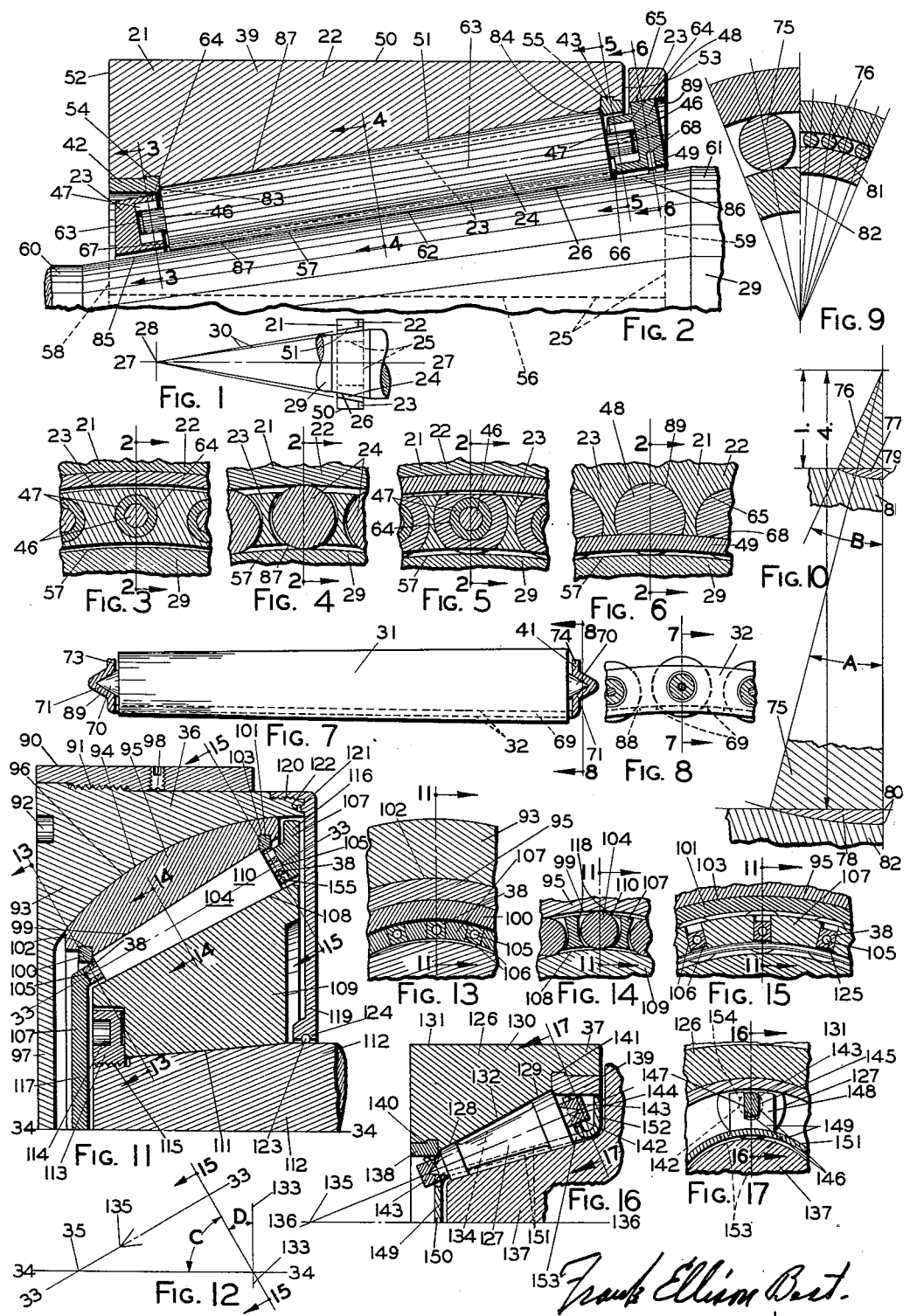

United States Patent Office 2,990,223
Patented June 27, 1961

2,990,223
TAPERED ROLLER BEARING
Frank Ellison Best, 10 N. Senate Ave.,
Indianapolis 4, Ind.
Filed June 6, 1955, Ser. No. 513,304
7 Claims. (Cl. 308—207)

My invention pertains to improvements in combined radial and thrust tapered roller bearings and pioneers a new art of taper-pin roller bearings, which measurably advances and extends the bearing art by filling up a conspicuous, void-like gap therein with a wide range of heretofore unappreciated tapered roller bearings of novel methods of manufacture, structure and proportions defined as tapered roller bearings having taper-pin rollers in which the axes of the rollers are rigidly held in alignment in axial planes of the bearings by rigid cage means cooperative with trunion or pivot bearing means at both ends of said taper-pin rollers, and in which the length of the said rollers range from three to twenty times the mean diameter thereof.

This wide range of most desirable bearings stands vacant and dormant in the practical art and, until now, unappreciated, undisclosed and unclaimed in the patent art.

More specific objects of my invention are:

(1) To measurably reduce the outside diameter and to increase the bore diameter of bearings of the same roller length, roller diametrical pitch, load and velocity ratings by reducing the diameter of the rollers and correspondingly increasing the number of rollers in the bearing. This makes thinner cup and cone races possible because of the better distribution of the load.

(2) To remove the conventional roller "groove" from the cone and thus make possible more perfect cone rolling contact surfaces.

(3) To improve the endwise alignment of the tapered rollers by well designed and fitted guide rings mounted in the cup.

(4) Also to considerably reduce guide ring wear since a certain point in the cup is much less frequently visited by a roller than a point on the cone because of the differences of circumferences of cone and cup and the wear is thus spread over a greater circumferal area.

(5) To improve by "no-play" pinion mountings of the ends of the rollers in rigid cages carried on said pinions.

(6) To secure the cage and roller assembly to and inside of the cups for better protection thereof in handling.

(7) And to make more readily possible the mounting of the combined cup, roller and cage assembly directly onto a greatly enlarged shaft with the cone thus "built in" therein as an integral part thereof.

(8) To thus increase the load carrying power at greater speeds because of the reduced friction, frictional heat, wear and power loss.

(9) To thus make a lighter, more compact and longer lived bearing of greater dependability, particularly for aircraft, submarines, railways and other transit means, as well as for all branches of industry and commerce.

(10) To provide bearings adapted to operate successfully without lubrication so that an oil failure will not result in a bearing failure.

(11) To provide bearings adapted for unlubricated service in ovens and industrial furnaces over the temperatures of lubricants and in deep freeze, refrigerators and gas liquefiers below the freezing point of lubricants.

(12) To provide bearings adapted to operate successfully bathed in many chemical and bio-chemical solutions such as in canning factories and industrial retorts, etc.

I attain these and other objects by means illustrated in the accompanying drawings which are orthographically correct and completed only to the point of clarity of representation, in which:

FIGURE 1 is an axial sectional view of a bearing 21, of my invention, showing a fragment of a shaft 29 having a conical frustum portion 26 laid therein in relief.

FIGURE 2 shows the upper portion of the same enlarged, or of a similar bearing of larger size, as taken on lines 2—2 of FIGURES 3, 4, 5 and 6.

FIGURES 3, 4, 5 and 6 are fragmentary oblique sections of said bearing 21 as taken on lines 3—3, 4—4, 5—5 and 6—6 respectively of FIGURE 2.

FIGURE 7 is a fragmentary axial section of an alternate roller and cage assembly 41, which is adaptable for use as a substitute in place of cage 23 and rollers 24 of said bearing 21, comprising rollers 31 and cage 32, with a roller 31 shown in relief, as taken on line 7—7 of FIGURE 8.

FIGURE 8 is a fragmentary transverse section of the same as taken on line 8—8 of FIGURE 7.

FIGURE 9 is a fragmentary composite transverse section of typical bearings of the prior art on the left and of my invention on the right, showing the difference in weight and size of the relative parts of said bearing of comparable load capacity, speed and width.

FIGURE 10 is a diagram illustrating the load and deformation characteristics of rollers and cones of a difference of roller diameters of 4 to 1.

FIGURE 11 is a fragmentary axial section of an endclosure or foot-step thrust bearing 36 with excellent radial characteristics as well, with certain elements laid in in relief and as taken on line 11—11 of FIGURES 13, 14 and 15.

FIGURE 12 is a continuation of axes 33—33 and 34—34 of FIGURE 11 to their intersection at 35.

FIGURES 13, 14 and 15 are fragmentary oblique sections of bearing 36 as taken on lines 13—13, 14—14 and 15—15 respectively of FIGURE 11.

FIGURE 16 is a fragmentary half axial section of a thrust and radial bearing 37 of my invention adapted for light high speed duty somewhat similar to the showing of FIGURES 11 to 15 inclusive, with the cup formed in a rectangular block for service such as to replace rectangular blocks 38 of FIGURES 11, 13 and 15, particularly when the bearing 36 of FIGURES 11 to 15 inclusive are of large sizes, as taken on line 16—16 of FIGURE 17.

FIGURE 17 is a fragmentary oblique cross section of the same as taken on line 17—17 of FIGURE 16.

Like characters refer to the same or similar parts throughout the several views.

In the more detailed description, FIGURES 1 to 6 inclusive show bearing 21 comprising cups 22, cages 23, rollers 24, ordinary cone 25 and special shaft 29 with a built-in cone 26.

Cup 22 is preferably an annulus-shaped element generated about axis 27—27 with a cylindrical outside boundary 50 and an inside boundary 51 comprising a concave conical frustum with its apex at the locus of apexes 28 on said axis 27—27. This is the important roller contact surface of said cup 22, and great precision is required in its finishing. Therefore, I have designed it so that the finishing means can travel lengthwise of this surface and way beyond its flat annular end boundaries 52 and 53 perpendicular to axis 27—27 at each end at uniform velocities so as to make the most perfect surface possible in practice. Then I grind-in annular notches 54 and 55 to remove imperfect wavy end portions of said surface 51 caused by the beginning and ending of the finishing strokes of the finishing means. This leaves the most perfectly finished surface 51 throughout its shown length that is humanly possible of production.

Next I preferably shrink-fit precision made annular roller guide rings 42 and 43 into said notches 54 and 55 respectively to complete said cup 22. These have precision-finished surfaces 83 and 84 which extend inwardly beyond surface 51 suitably to provide end guides to rollers 24 in close fitting contact therewith.

Ordinary cone 25, shown dotted, is generated about axis 27—27 and has an inside cylindrical bore 56 and an outside boundary 57 which is a frustum of a cone with its apex at the locus of apexes 28 in said axis 27—27. This is the roller contact surface of the said cone 25 which extends considerable distance beyond the rollers 24 so that the wavy imperfections of these end portions 85 and 86 wil not come in contact with rollers 24. The ends 58 and 59 of said cone 25 are flat annular surfaces.

Ordinary cone 25 may be replaced, as shown in this instance, by a shaft 29 having a conical frustum portion 26 between two cylindrical portions 60 and 61. Conical frustum 26 is generated about axis 27—27 with its apex at the locus of apexes 28 in said axis 27—27 and extends considerably beyond the length of rollers 24 at each end so that the wavy imperfectly finished end portions 85 and 86 thereof will not come in contact with rollers 24.

Rollers 24 are of the long slender conical taper-pin type with locus of apexes at 28.

They are first made and their conical surfaces finished longer than shown so that the finishing means may sweep beyond the full length at uniform velocity.

Then the wavy imperfect ends, resulting from the engaging and letting-go process of the finishing means, are ground away to form trunnion ends 46 leaving a perfect rolling contact surface 87 for engagement of like perfect conical surfaces of said cup 22 and cone 25 or 26.

Snugly fitting the trunnions 46 at both ends are cylindrical bushings or bearings 47 which in turn snugly fit in cylindrical holes 64 in cage 23 and bushing adapters 48. Bushing adapters 48 at the right end of the rollers snugly fit holes 65 in cage 23 and are held in place by arcuate snap ring 49 in annular groove 68. By this means the rollers 24 are held in transverse alignment in cage 23 so that the axes 63—63 and 27—27 always intersect at the locus of apexes 28.

The cage 23 is preferably of die-cast or sintered-metal manufacture. It is a conical spider flanged at the base and terminated at its frustum top, having roller receptacle holes 89 lying in axial planes of said cage, the rollers being inserted from the right end through these holes 89 and secured therein by bushing adapters 48 and snap ring 49.

Endwise movement of the cage 23 relative to roller 24 is provided by spaces 66 and 67 at both ends of said rollers; and the flare of axis 63—63 relative to axis 27—27 serves to provide endwise alignment of said cage 23 relative to said rollers 24. Thus said cage 23 provides transverse alignment of the rollers and at the same time rides free and clear of them and is aligned endwise by the flare of axis 63—63 relative to axis 27—27.

In FIGURES 7 and 8 a less expensive although less rugged conical cup-like alternate cage 32 is shown that can be formed out of a tube or flat sheet of metal by punch-press methods. In general appearance it is like a hollow shell-like frustum of a cone without top or bottom but with annular rims or flanges 73 and 74 turned outward at both ends and a number of long slots or holes 69 shaped like frustums of isosceles triangles spaced apart uniformly round about the conical portion of said cage with the axes of the said isosceles triangles lying in axial planes of said conical cage, of size an proportion such as to permit rollers 31 to protrude inwardly therethrough with proper clearance space 88 round about said rollers for unobstructed contact with cones 25 or 26.

Flanges 73 and 74 are provided with cone-shaped indentations 71 that snugly fit conical pinions 70 of rollers 31 and hold the same by spring tension of said cage 32 in preloaded bearing contact with said pinions 70, all of which serves to accurately, positively and properly align said rollers 31 relative to the cage 32, cup 22 and cones 25 or 26 of the bearing 21.

In this combination of cage and rollers, conical pinions 70 fitting in conical holes 71, replace trunnions 46 and bushings 47 respectively of FIGURES 1 to 6 inclusive.

FIGURES 9 and 10 should be considered together. Here I am showing the advantages of rollers of smaller diameter over rollers of the same length of larger diameters and am using roller diameters of 4 to 1 ratios in way of illustration.

The diameter of roller 75 is 4 times that of roller 76.

FIGURE 10 is drawn to a much larger scale than FIGURE 9 and shows only a small portion of said rollers 75 and 76.

There are 4 times as many rollers 76 as there are rollers 75 in a bearing so each roller 76 has to carry only one fourth the load of a roller 75 in bearings of like load ratings.

It is common scientific knowledge that the deflection of a spring is directly proportional to the pressure so we may expect that the loads applied to the aforesaid rollers will be directly proportional to the areas of deformation 77 and 78 which are 1 to 4 ratios, produced thereby; i.e., length, measured by angles A and B times the depths of the deformation 79 and 80. Accordingly area 77 is made one fourth that of area 78.

From this we learn that the area of contact of the smaller roller 76 is of the greater angular width B as compared with the lesser angular width A of the larger bearing 75. This favors the small bearing by spreading its load over a relatively larger area.

Then again the depth of deflection of the smaller roller is less than that of the larger roller. This also favors the smaller roller as the actual depth of deformation is less in the smaller roller.

Likewise the deformation of races 81 and 82 favors the smaller roller for the race 81 has four points of small deformation while the race 82 has one point of great deformation. Thus we see that in bearing of relatively smaller rollers the life or both rollers and races is prolonged over the bearing of larger rollers.

Futhermore, since the load on races of bearings of relatively smaller diametered rollers is better distributed, the races can be thinner and the bore increased and the outside diameter decreased as shown, FIG. 9.

This is a matter of very great concern, for the engineer designing a machine is always crowded for space and a smaller bearing of the same capacity is always to be preferred.

Then a larger shaft is always welcomed in the interest of more rugged construction.

Then again the weight of the bearing is an important consideration in aircraft and all other vehicles. This favors the bearing with the smaller rollers.

Of course, there is a limit to the practical smallness of rollers, but taper-pins are of that practical smallness of size as tested over many decades of use, and any roller that is of the proportions of any practical taper-pin will be a practical roller in a precision bearing.

In FIGURES 11 to 15 inclusive, I show a self-aligning type of end-closure or foot-step thrust and radial bearing having the characteristics of my invention.

This comprises a frame 90 within which is screw adjusted, by mating threads 91 and spanner holes 92, a saddle 93, cylindrical on the outside and having a spherical seat 94 on the inside adapted to form fit the outside spherical surface 96 of adapter ring 95. Said saddle 93 preferably has an end closure plate 97 that seals off the end of said bearing 36. A set screw 98 in said frame 90 secures saddle 93 in proper preloading adjustment in said frame 90.

Adapter ring 95 constitutes the race cup of said bearing and has as its inner surface a conical roller contact surface 99 with guide rings 100 and 101 preferably shrink-fitted into annular notches 102 and 103 respectively therein.

In contact with conical surface 99 are rollers 104 having trunnions 105 at both ends thereof snugly fitting in rectangular block bushings 38 snugly fitting in parallel walled grooves 106 in cage 107. The only freedom of motion of block bushing 38 is back and forth along section line 15—15 of FIGURE 11 and section lines 11—11 of FIGURES 13 and 15. This permits the rollers 104 to freely contact conical cup race surface 99.

Contacting rollers 104 on the inner side is conical surface 108 of cone 109. Conical surfaces 110 of rollers 104, conical surface 99 of adapter ring 95 and conical surface 108 of cone 109 have their apexes at the locus of conical apexes 35, FIGURE 12, and are all finished as taught in explaining the finish of conical surfaces of FIGURES 1 to 6 inclusive.

Cone 109 in this instance has a central tapered hole 111 closely fitting shaft 112. A nut 113 having spanner holes 114, secures said shaft 112 to said cone 109 by mating threads 115.

Cage 107 is pie-pan shaped with an annular rim 116 at the top and a solid floor 117 at the bottom. Into this are formed openings 118 for the rollers best seen in FIGURE 14, and rectangular slots or grooves 106 for blocks 38 at both ends, seen in FIGURES 11, 13 and 15.

The fact that there is no end-play of rollers 104 and blocks 38 in cage 107, as is the case, and that the rollers 104 are held, as they are, in preloaded contact with cup 95 and cone 109 and that the freedom of motion of blocks 38 is limited to movement back and forth along section line 15—15 of FIGURES 11 and 12 which forms substantial angles C and D with the axis 34—34 of the bearing and plane 133—133 perpendicular thereto respectively, result in the cage 107 being suspended free and clear of said rollers, cup and cone with its axis in axis line 34—34 and its endwise location rigidly held substantially as shown in FIGURE 11.

On the right hand side of FIGURE 11 is shown an annular flanged sealing plate 119 secured to saddle 93 by mating threads 120. A gasket 121 in groove 122 in saddle 93 seals the juncture between saddle 93 and plate 119. A gasket 123 in groove 124 seals the juncture between said plate 119 and shaft 112.

This bearing is preferably turned up on its left end and a requisite supply of oil or grease is placed in it before plate 119 is secured in place. Thus the bearing is sealed for life, or if it is to operate dry, its metallic parts should be made of suitable grades of stainless steel hardened and ground and blocks 38 should be made of cast iron, with the hole 125 therein glazed by running it in with oil on an expanding and rotating arbor to bring it glazed at its proper diameter before it is assembled in the bearing.

An important characteristic of said bearing 36 is that the angular taper of the rollers 104 is relatively small so as to correspondingly reduce the wedging reaction thereof towards guide ring 101 and at the same time the angle between conical surface 108 of cone 109 with the axis 34—34 of said cone 109 is relatively large and several times said angular taper so as to prevent any possible "locking angle" reactions between said rollers 104 and said cone 109.

FIGURES 16 and 17 show still another type of thrust bearing 126 with pronounced radial characteristics also. This is particularly adaptable for high speeds and light loads.

When bearings 36 of FIGURES 11 to 15 are of very large size and particularly when said bearings 36 are to be operated dry or in chemical solutions, it is recommended to change the trunnions 105 to cones 137 on rollers 104 and the blocks 38 to cups 130 of this latest type of bearing 126 and make the metallic parts thereof out of suitable grades of stainless steel. Thus replacing trunnions 105 and block 38 by relatively small or miniature bearings 126.

In this particular adaptation of this bearing 126 for use in bearing 36, I preferably use only three conical rollers 123, with their apexes at point 135 in bearing axis 136—136, and utilize only short rolling contact end sections 128 and 129 thereof with the space between relieved to line 134 of rollers 127.

The cup 130 of this bearing 126, in this application to bearing 36, comprises a rectangular exterior boundary 131, suitable to replace block 38, having an inside conical rolling contact boundary wall 132 with its conical apex at point 135 on bearing axis 136—136, which upon this application coincides with bearing axis 33—33 of FIGURES 11 and 12, as shown at 135 in FIGURE 12.

In rolling contact with rollers 127 is the cone 137 of this bearing with its apex also at point 135 of bearing and cone axis 136—136 or 33—33 as the case may be.

Cup 130 has roller guide rings 138 and 139 preferably shrink-fitted into annular notches 140 and 141 respectively of said cup 130. The art of perfecting the said conical rolling contact surfaces of this bearing, is the same as that taught in connection with bearing 21 of FIGURES 1 to 6 inclusive.

Preferably, rollers 127 have pinions 142 that are in preloaded contact with pinion blocks 143 at both ends, preferably made of a suitable grade of stainless steel that has been hardened very hard, with a conical cup 144 in one end thereof which is ground and polished very true and smooth for the reception of pivots 142. The general outside form is cylindrical, being generated about the axis of said cup 144 with slabbed-off portions 145 on each side on the end opposite the cone end between symmetrical flats 146, which closely fit walls 147 of ears 148 of cage 149.

Cage 149 is preferably a sheet metal stamping in the form of a pie pan with a flat bottom 150, a conical frustum part 151 and a flat top flange 152 parallel with the flat bottom 150.

The conical frustum part 151 has three roller openings 153, 120° apart, which are merely clearance holes for rollers 127 to extend through for contact with cone 137, and a portion of the stamped out roller openings are turned outward and formed into said ears 148, which apply preloading spring pressure to shoulders 154 of said blocks 143.

Having thus described my invention, what I claim as new and desire to secure by Letters Patent of the United States is:

1. In a roller bearing, a bearing cup having an internal tapered roller contacting surface and having an internal annular groove at each end thereof beyond said roller contacting surface, tapered bearing rollers within said cup, co-axial trunnions of smaller diameter than said rollers on the ends of said rollers leaving shoulders on the ends of said rollers outwardly from said trunnions, a guide ring rigidly secured in the annular groove adjacent each end of said cup and protruding a short distance inwardly into the cup in guiding and stopping relation relative to the shouldered ends of the rollers, the two guide rings being spaced apart a distance slightly greater than the over-all length between the shouldered end portions of the rollers providing limited free endwise adjustment of the rollers, a roller holding cage in said cup, and bearing members in said cage receiving and rotatively supporting the trunnions on the ends of the rollers and maintaining correct transverse alignment of said rollers.

2. In a tapered roller bearing, a tapered roller holding cage, tapered rollers in said cage, co-axial trunnions on the ends of said rollers, bushings supported in the smaller end of said cage receiving the trunnions on the adjacent ends of the rollers, an outwardly directed flange on the larger end of said cage, said flange being provided with openings slightly larger than the maximum diameter of said rollers providing for insertion of said rollers through said openings into said cage, bushings receiving the trunnions on the larger ends of said rollers, and bushing adapter members supported within the openings in the end flange of said cage and receiving and supporting the adjacent bushings.

3. In a roller bearing, tapered rollers, conical trunnions protruding axially from the respective ends of said rollers, and resilient roller cage means receiving and rotatively supporting said trunnions and exerting an inward longitudinal pressure on the trunnions at both ends of each roller providing longitudinal pre-loading of said rollers.

4. In a roller bearing, tapered rollers, axially disposed trunnions on the ends of said rollers, and movably supported bearing means receiving and rotatively supporting said trunnions and providing limited self-adjustment of said rollers in directions radially of the bearing.

5. In a roller bearing, tapered rollers, axially disposed trunnions on the ends of said rollers, movable bearing members receiving and rotatively supporting said trunnions, and cage means movably supporting said bearing members providing transverse self-adjustment of said rollers in directions radially of the bearing while maintaining correct longitudinal alignment of said rollers.

6. In a roller bearing, a bearing cone, tapered rollers positioned around said cone, a tapered bearing cup extending around said rollers, axially disposed trunnions on the ends of said rollers, movable bearing members receiving and rotatively supporting said trunnions, and cage means supporting said bearing members for limited movement toward and away from the axis of the bearing providing transverse self-adjustment of the rollers in planes common to the axis of the bearing and the axes of the rollers while maintaining correct transverse alignment of the rollers in all other planes.

7. In a roller bearing, a roller supporting cage, tapered rollers in said cage, axially disposed conical trunnions on the ends of said rollers, bearing members receiving and rotatively supporting said trunnions, and resilient means on said cage movably supporting said bearing members and exerting an inward longitudinal pressure on the trunnions at both ends of each roller providing pre-loading of said rollers longitudinally and transverse self-adjustment of said rollers in directions radially of the bearing and correct transverse alignment of the rollers in directions substantially at right angles to radial planes of the bearing.

References Cited in the file of this patent

UNITED STATES PATENTS

| | | |
|---|---|---|
| 703,405 | Griffin | July 1, 1902 |
| 729,987 | Wright | June 2, 1903 |
| 890,106 | Tschantz | June 9, 1908 |
| 1,232,523 | Folk | July 10, 1917 |
| 1,294,183 | Simmons | Feb. 11, 1919 |
| 1,301,389 | Conrow | Apr. 22, 1919 |
| 1,376,311 | Armstrong | Apr. 26, 1921 |
| 1,672,012 | Tyson | June 5, 1928 |
| 1,843,293 | Medved | Feb. 2, 1932 |
| 1,865,392 | Hutchinson et al. | June 28, 1932 |
| 1,879,110 | Cramer | Sept. 27, 1932 |
| 1,880,347 | Herrmann | Oct. 7, 1932 |
| 1,970,449 | Gibbons et al. | Aug. 14, 1934 |
| 1,995,838 | Buckwalter | Mar. 26, 1935 |
| 2,024,206 | Buel | Dec. 17, 1935 |
| 2,074,202 | Benedek | Mar. 16, 1937 |
| 2,105,013 | Scribner | Jan. 11, 1938 |
| 2,197,883 | Sinclair | Apr. 23, 1940 |

FOREIGN PATENTS

| | | |
|---|---|---|
| 868,682 | Germany | Feb. 26, 1953 |
| 753,430 | Great Britain | Feb. 25, 1956 |

OTHER REFERENCES

Periodical "Product Engineering," page 116, March 1933, title of article: "Bantam" Needle Type Roller Bearings.